United States Patent [19]

Moriyama et al.

[11] Patent Number: 5,177,138

[45] Date of Patent: Jan. 5, 1993

[54] RESIN COMPOSITION INCLUDING A SAPONIFIED ETHYLENE-VINYL ACETATE COPOLYMER, POLYOLEFIN, A GRAFT COPOLYMER AND HYDROTALCITE

[75] Inventors: Takamasa Moriyama, Osaka; Hiroyuki Honda, Kanagawa; Hiroshi Takida, Osaka, all of Japan

[73] Assignee: Nippon Gohsei Kagaku Kogyo Kabushiki Kaisha, Osaka, Japan

[21] Appl. No.: 870,194

[22] Filed: Apr. 13, 1992

Related U.S. Application Data

[63] Continuation of Ser. No. 646,036, Jan. 28, 1991, abandoned.

[30] Foreign Application Priority Data

Feb. 1, 1990 [JP] Japan ............... 2-23017
Oct. 29, 1990 [JP] Japan ............... 2-293072

[51] Int. Cl.$^5$ ............... C08J 5/10; C08K 3/10; C08L 23/08
[52] U.S. Cl. ............... 524/437; 524/436
[58] Field of Search ............... 524/436, 437

[56] References Cited

U.S. PATENT DOCUMENTS

| | | |
|---|---|---|
| 3,375,300 | 3/1968 | Ropp . |
| 3,975,463 | 8/1986 | Hirata et al. . |
| 4,041,223 | 9/1977 | Amemiya ............... 526/10 |
| 4,058,647 | 11/1977 | Inoue et al. . |
| 4,261,473 | 4/1981 | Yamada et al. . |
| 4,370,388 | 1/1983 | Mito et al. . |
| 4,472,555 | 9/1984 | Schmulker et al. . |
| 4,594,386 | 6/1986 | Olivier . |
| 4,600,746 | 7/1986 | Schmulker et al. . |
| 4,613,644 | 9/1986 | Moritani . |
| 4,675,356 | 6/1987 | Miyata . |
| 4,704,423 | 11/1987 | Iwanami et al. ............... 524/417 |
| 4,758,477 | 7/1988 | Okano et al. . |
| 4,795,781 | 1/1989 | Miyamoto et al. ............... 525/58 |
| 4,864,002 | 9/1989 | Schekutz et al. . |
| 4,904,723 | 9/1990 | Uemura et al. . |
| 4,910,254 | 3/1990 | Johnston . |
| 4,962,148 | 10/1990 | Orikasa et al. . |
| 4,963,608 | 10/1990 | Kunieda ............... 524/394 |

FOREIGN PATENT DOCUMENTS

31708/89 9/1989 Australia .
0342066 11/1989 European Pat. Off. .
284524 11/1989 Japan .

*Primary Examiner*—Paul R. Michl
*Assistant Examiner*—U. K. Rajguru
*Attorney, Agent, or Firm*—Armstrong & Kubovcik

[57] ABSTRACT

A resin composition which comprises
(A) a saponified ethylene-vinyl acetate copolymer,
(B) a polyolefin resin,
(C) a graft polymer obtained by grafting an ethylenically unsaturated carboxylic acid or a derivative thereof to a polyolefin resin and reacting the adduct with a polyamide oligomer or polyamide, and
(D) a hydrotalcite compound representable by the general formula $$M_xAl_y(OH)_{2x+3y-2z}(E)_z \cdot aH_2O$$

wherein M is Mg, Ca or Zn, E is $CO_3$ or $HOP_4$, x, y and z each independently is a positive number and a is 0 (zero) or a positive number.

5 Claims, No Drawings

RESIN COMPOSITION INCLUDING A SAPONIFIED ETHYLENE-VINYL ACETATE COPOLYMER, POLYOLEFIN, A GRAFT COPOLYMER AND HYDROTALCITE

This application is a continuation of application Ser. No. 646,036 filed Jan. 28, 1991 now abandoned.

BACKGROUND OF THE INVENTION

1. Industrial Field of Utilization

The present invention provides a saponified ethylene-vinyl acetate copolymer composition markedly improved in long run property in melt-molding and in quality.

2. Prior Art

Saponified ethylene-vinyl acetate copolymers are excellent in various properties such as oxygen barrier property, mechanical strength, etc., and therefore have found application in various uses such as a film, sheet, container material, textile fiber and so on.

However, since such saponified copolymers are highly hygroscopic, shaped articles based on these materials are disadvantageous in that they undergo marked changes in physical properties such as flexibility according to changes in the humidity and temperature of the ambient atmosphere and, in particular, their oxygen barrier property is so highly dependent on humidity that they do not effectively seal off oxygen in a high-humidity environment.

Furthermore, because of poor stretchability and flexibility, shaped articles based on this type of copolymer readily undergo uneven stretching in the course of deep-drawing or other molding procedures involving stretching and/or have pinholes in use after molding, imposing limitations on their use as packaging materials. Therefore a polyolefin resin is often admixed with said saponified copolymers.

However, such resin mixtures as mentioned above are inferior in the so-called long run property. When they are used to produce films, sheets and the like shaped articles by melt-molding, for instance, said mixture compositions undergo gelation during molding and/or have, during molding, thermally discolored or carbonized resins (the so-called scorches), which adhere to the extruder interior. Accordingly the melt molding cannot be done continuously for a prolonged period of time. To cope with this problem, the combined use of a hydrotalcite solid solution has been proposed as a measure therefor.

PROBLEMS WHICH THE INVENTION IS TO SOLVE

Recent technological innovations and social needs for higher quality shaped articles have emphasized the necessity of developing novel saponified ethylene-vinyl acetate copolymer compositions much more improved than the conventional ones.

More specifically, the prior art compositions are often used in the form of laminates with a polyolefin or polyester or the like thermoplastic resin When exposed to a high-temperature, high-humidity atmosphere, the laminates in the form of packaging materials for retortable foods, for instance, often undergo a decrease in interlayer adhesion, which may lead to the occurrence of the phenomenon of peeling or whitening (blushing). Development of improved compositions is strongly demanded.

SUMMARY OF THE INVENTION

The inventors of the present invention made intensive investigations in an attempt to develop a saponified ethylene-vinyl acetate copolymer composition having excellent long run property and ensuring higher quality characteristics as compared with the conventional compositions, for example, markedly improved interlayer adhesion, among others, even in a high-temperature high-humidity atmosphere, with the oxygen barrier property intrinsic of the saponified copolymer being retained at a high level. As a result, they found that the objects such as mentioned above can be accomplished by a resin composition which comprises (A) a saponified ethylene-vinyl acetate copolymer,
(B) a polyolefin resin,
(C) A graft polymer obtained by grafting an ethylenically unsaturated carboxylic acid or a derivative thereof to a polyolefin resin and reacting the adduct with a polyamide oligomer or polyamide, and
(D) a hydrotaloite compound representable by the general formula

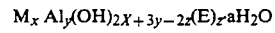

wherein M is Mg, Ca or Zn, E is $CO_3$ or $HPO_4$, x, y and z each independently is a positive number and a is 0 (zero) or a positive number. The present invention has been completed based on the above finding.

DETAILED DESCRIPTION OF THE INVENTION

The present invention will hereinafter be described in detail, with emphasis placed on such composition and, in particular, on uses for shaped articles based thereon.

The saponified ethylene-vinyl acetate copolymer (A) to be employed in accordance with the present invention should have an ethylene content of 20 to 60 mole %, preferably 25 to 55 mole %, with a degree of saponification of its vinyl acetate component being not less than 95 mole %.

With an ethylene content less than 20 mole %, the oxygen barrier property under high-humidity conditions is not as high as desired, while an ethylene content in excess of 60 mole % leads to decreases in oxygen barrier property, printability and other physical properties. When the degree of saponification or hydrolysis is less than 95 mole %, the oxygen barrier property and moisture resistance are sacrificed.

It should be understood that this saponified copolymer may contain small proportions of other comonomer ingredients including α-olefins such as propylene, isobutene, α-octene, α-dodecene, α-octadecene, etc., unsaturated carboxylic acids or salts thereof, partial alkyl esters, complete alkyl esters, nitriles, amides and anhydrides and unsaturated sulfonic acids or salts thereof.

With regard to the above component (A), its melt flow rate (hereinafter referred to briefly as MFR) $M_1$ as determined at 210° C. and under a load of 2160 g according to JIS K-6760 is suitably in the range of 0.5 to 100 g/10 minutes and preferably 1 to 60 g/10 minutes.

With regard to the polyolefin resin (B(), there may be mentioned linear low-density polyethylene, medium- and high-density polyethylenes, ionomers, ethylene-propylene copolymer, crystalline polypropylene, polybutene, ethylene-vinyl acetate copolymer of comparatively low vinyl acetate content, and so on. Particularly, low-, medium- or high-density polyethylene, and isotactic polypropylene are of practical importance.

With regard to (B), it is advantageous that its melt flow rate as determined at 210° C. and under a load of 2160 g according to JIS K-6760 is in the range of 0.01 to 100 g/10 minutes For improving the compatibility among the components of the desired resin composition, incorporation of (C) is essential in the practice of the invention.

The component (C) is a graft polymer obtainable by grafting an ethylenically unsaturated carboxylic acid or a derivative thereof to a polyolefin resin and reacting this carboxylic acid or derivative thereof with a polyamide oligomer or polyamide.

This qraft polymer can be produced by dissolving or suspending a polyolefin resin in an appropriate solvent or putting it in a molten state, activating the polyolefin resin chain with a peroxide or diazo initiator, grafting an ethylenically unsaturated carboxylic acid or a derivative thereof thereto to give a polymer and mixing this polymer with a polyamide oligomer or polyamide in molten state.

For this reaction, Brabender machine, Buss blender, single-screw extruder, Werner and Pfleiderer twin-screw extruder or the like is employed The degree of polymerization of the polyolefin resin to be employed is about 350 to 45,000 and preferably about 500 to 10,000. The melt flow rate (230° C., load 2160 g; the same applies hereinafter) is about 0.1 to 50 g/10 minutes for all practical purposes.

The reaction ratio of the polyolefin resin to the ethylenically unsaturated carboxylic acid or a derivative thereof is 100/0.05 through 100/10 and preferably 100/0.5 through 100/3 as expressed on the weight basis.

If the ratio is 100/less than 0.5, the improving effect on compatibility will not be sufficient. On the other hand, if the ratio is 100/more than 10, the viscosity will be too high for practical molding.

The degree of polymerization of said polyamide oligomer is 5 to 80, preferably not less than 15, and the degree of polymerization of said polyamide is 80 to 1000, preferably not more than 500, for all practical purposes and the reaction ratio is 0.01 to 1 mole and preferably 0.05 to 0.9 mole per mole of the carboxyl group.

As examples of the polyolefin resin, there may be mentioned linear low-density, low-density or high-density polyethylene, ionomers, ethylene-propylene copolymer, crystalline polypropylene, polybutene, ethylene-vinyl acetate copolymer, ethylene-propylene copolymer and so on. Important for practical purposes are linear low-density polyethylene, low-density polyethylene, high-density polyethylene, ethylene-propylene copolymer, ethylene-vinyl acetate copolymer and crystalline polypropylene.

The ethylenically unsaturated carboxylic acid or derivative thereof to be grafted to such a trunk polymer includes, among others, unsaturated carboxylic acids such as acrylic acid, methacrylic acid, crotonic acid, maleic acid, fumaric acid and itaconic acid, and the corresponding anhydrides or half esters.

The polyamide oligomer or polyamide can be prepared by the known methods such as addition polymerization of a lactam, polycondensation of an aminocarboxylic acid, polycondensation of a diamine with a dicarboxylic acid, and so on.

Examples of the starting materials for said polyamide oligomer or polyamide are various lactams such as ε-caprolactam, enantholactam, caprylolactam, laurolactam, α-pyrrolidone, α-piperidone, etc., ω-amino acids such as 6-aminocaproic acid, 7-aminoheptanoic acid, 9-aminononanoic acid, 11-aminoundecanoic acid, etc., dibasic acids such as adipic acid, glutaric acid, pimellic acid, suberic acid, azelaic acid, sebacic acid, undecadioic acid, dodecadioic acid, hexadecadioic acid, hexadecenedioic acid, eicosadioic acid, eicosadienedioic acid, diglycolic acid, 2,2,4-trimethyladipic acid, xylylenedicarboxylic acid, 1,4-cyclohexandicarboxylic acid, terephthalic acid, isophthalic acid, etc., and diamines such as hexamethylenediamine, tetramethylenediamine, nonamethylenediamine, undecamethylenediamine, dodecamethylenediamine, 2,2,4- (or 2,4,4-)trimethylhexamethylenediamine, bis(4,4'-aminocyclohexyl)methane, metaxylylenediamine and so on. For molecular weight control, a monoamine such as laurylamine or oleylamine can also be used in an appropriate amount.

In the composition of the present invention, the proportion of (A) should be 50 to 99.5 weight % and preferably 60 to 95 weight %, that of (B) should be 0.4 to 50 weight % and preferably 4.5 to 35 weight %, and that of (C) should be 0.1 to 15 weight % and preferably 1.5 to 10 weight %.

When the proportion of (A) is less than 50 weight % or that of (B) is over 50 weight %, the oxygen barrier property is adversely affected. Conversely when the proportion of (A) is over 99.5 weight % or that of (B) is less than 0.4 weight %, stretchability and flexibility are sacrificed. When the proportion of (C) is less than 0.1 weight %, the compatibility between (A) and (B) is poor, so that the interlayer adhesion of laminates decreases. Conversely when the proportion of (C) exceeds 15 weight %, long-run mold-ability is adversely affected The component (D) to be employed in accordance with the present invention is a hydrotalcite compound representable by the general formula

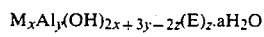

$$M_xAl_y(OH)_{2x+3y-2z}(E)_z \cdot aH_2O$$

wherein M is Mg, Ca or Zn, E is $CO_3$ or $HPO_4$, x, y and z each independently is a positive number and a is 0 (zero) or a positive number.

As typical examples of such compound, there may be mentioned, among others, the following:
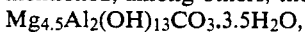
$Mg_{4.5}Al_2(OH)_{13}CO_3 \cdot 3.5H_2O$,
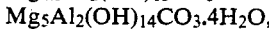
$Mg_5Al_2(OH)_{14}CO_3 \cdot 4H_2O$,
$Mg_6Al_2(OH)_{16}CO_3 \cdot 4H_2O$,
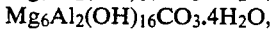
$Mg_8Al_2(OH)_{20}CO_3 \cdot 5H_2O$,
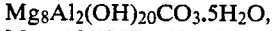
$Mg_{10}Al_2(OH)_{22}(CO_3)_2 \cdot 4H_2O$,
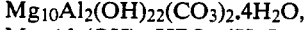
$Mg_6Al_2(OH)_{16}HPO_4 \cdot 4H_2O$,
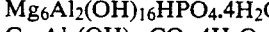
$Ca_6Al_2(OH)_{16}CO_3 \cdot 4H_2O$ and
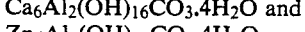
$Zn_6Al_6(OH)_{16}CO_3 \cdot 4H_2O$.
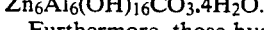

Furthermore, those hydrotalcite compounds derived from $Mg_2Al(OH)_9 \cdot 3H_2O$ by partial substitution of the OH groups thereof by $CO_3$ or $HPO_4$ which cannot be represented by a definite chemical formula and those modifications of talcite compounds such as mentioned above which are derived therefrom by elimination of water of crystallization (a=0) are expected to be comparable thereto in effect. In particular, those compounds in which M is Mg and E is $CO_3$ can show the most remarkable effect.

The component (D) is used in an amount of 0.005 to 5 parts by weight, preferably 0.01 to 1 part by weight, per 100 parts by weight of the sum total of (A) plus (B) plus (C).

When the amount of (D) is smaller than 0.005 part by weight, the long-run moldability is low while films will have decreased transparency, stretchability and flexibility when said amount exceeds 5 parts by weight.

The component (D) may be present in any form in the mixture of (A), (B) and (C). The time of addition of (D) is not critical. It is advantageous, however, to admix (D) with the polyolefin resin (B) in advance and then blend the masterbatch-like mixture with the components (A) and (C).

While the composition according to the present invention is useful for a variety of applications such as shaped articles, adhesives, coatings and so on, it is most useful for molding purposes and can be molded into pellets, film, sheet, containers, fibers, bars, pipe and other shaped articles by the melt-kneading technique. Such products can be crushed (for reclaiming) or pelleted for re-melt-molding.

For melt-molding of the composition, extrusion molding (e.g. T-die extrusion, inflation molding, blow molding, melt spinning or contour extrusion) and injection molding are mostly employed. The meltmolding temperature is selected in many cases from the range of 170° to 270° C. In addition to the above techniques, two-color molding and injection-blow molding techniques may also be employed and shaped articles with good dimensional tolerances can be manufactured.

In the molding process, it is of course possible to use two or more different saponified ethylene-vinyl acetate copolymers varying in ethylene content and/or in the degree of saponification in combination. In melt-molding, it is also possible to incorporate, besides the above-mentioned saponified ethylene-vinyl acetate copolymer, suitable amounts of additives such as a plasticizer (for example, a polyhydric alcohol), stabilizer, surfactant, crosslinking agent (for example, an epoxy compound, polyvalent metal salt, inorganic or organic polybasic acid or salt thereof), filler, colorant, reinforcing fiber (for example, glass fiber, carbon fiber, etc.), and so on. Any other thermoplastic resin may also be incorporated. Such thermoplastic resin includes, among others, polyolefins other than the component (B) mentioned above (linear low-density, low-density or high-density polyethylene, polypropylene, ethylene-propylene copolymer, ethylene-propylene-diene copolymers, copolymers of ethylene and an alpha-olefin containing 4 or more carbon atoms, ethylene-vinyl acetate copolymer, ethylene-acrylate ester copolymers, ionomers, polybutene, polypentene, etc.), modified polyolefins obtainable by graft-modification of such polyolefins with unsaturated carboxylic acids or derivatives thereof, polyamides, polyvinyl chloride, polyvinylidene chloride, polyesters, polystyrene, polyacrylonitrile, polyurethanes, polyacetal, polycarbonates, melt-moldable polyvinyl alcohol resin and so on.

As mentioned hereinbefore, the composition of the present invention is not only used for the manufacture of a single-layer article solely composed of the composition but also used often as a laminated article including at least one layer of the composition.

The layer of the composition of the present invention shows a characteristically high bonding affinity for the layer material to be laminated therewith. In particular, said bonding affinity can be retained at a high level even under high-temperature high-humidity conditions in retorts and the like.

In the manufacture of a laminated product according to the invention, in which a different material is laminated to one side or either side of a layer of the composition of the invention, the following laminating methods, for instance, can be employed Thus, the method which comprises melt-extruding a thermoplastic resin onto a film or sheet of the composition of the invention, the method which comprises melt-extruding the composition of the invention onto a substrate made of a thermoplastic resin or some other material, the method which comprises co-extruding the composition of the invention and a different thermoplastic resin, and the method in which a film or sheet of the composition of the invention is laminated to a film or sheet of a different material with a known adhesive such as an organotitanium compound, an isocyanate compound or a polyester compound can be mentioned.

As mating resins for co-extrusion, there may be mentioned linear low-density polyethylene, low-density polyethylene, medium-density polyethylene, high-density polyethylene, ethylene-vinyl acetate copolymer, ionomers, ethylene-α-olefin ($C_{3-20}$ α-olefin) copolymers, ethyleneacrylic ester copolymers, polypropylene, propylene-α-olefin ($C_{4-20}$ α-olefin) copolymers, homo- or copolymers of olefins such as polybutene, polypentene, etc., and polyolefin resins in a broad sense as obtainable by modifying such homopolymers or copolymers of olefins by grafting of an unsaturated carboxylic acid or an ester thereof, polyesters, polyamides, copolymerized polyamides, polyvinyl chloride, polyvinylidene chloride, acrylic resins, styrenic resins, vinyl ester resin, polyester elastomers, polyurethane elastomers, chlorinated polyethylene, chlorinated polypropylene and so on. A saponified ethylene-vinyl acetate copolymer can also be co-extruded.

When a film or sheet or the like shaped article is prepared from the composition of the invention and, then, extrusion-coated with a different material or laminated to a film or sheet of a different material with an adhesive, said different material is not limited to said thermoplastic resins but may be virtually any other material (such as paper, metal foil, uniaxially or biaxially oriented plastic film or sheet, woven fabric, nonwoven fabric, metal filament, wood and so on).

The laminar structure of said laminated product is optional. Thus, a layer of the composition of the invention being designated as A ($A_1$, $A_2$, ... ) and a layer of a different material, e.g. a thermoplastic resin, being designated as B ($B_1$, $B_2$, ... ), not only a two-layer structure of A/B but a variety of other combinations such as B/A/B, A/B/A, $A_1/A_2$/B, A/$B_1$/$B_2$, B/A/B, $B_2/B_1$/A/$B_1$/$B_2$, etc. can be employed for a film, sheet or bottle, for instance. In the case of a filament, a bimetal-type, core (A)—sheath (B), core (B)—sheath (A), eccentric core-sheath and other combinations of A and B can be adopted.

For co-extrusion, A may be blended with B or vice versa, or for improved interlayer adhesion, a suitable resin may be incorporated in at least one of A and B.

The laminated product may be optionally configured. Thus, film, sheet, tape, bottle, pipe, filament, or modified cross-section extrudate may be mentioned.

The laminated product may, if necessary, be further subjected to a variety of processings, such as heat treatment, cooling, rolling, printing, dry lamination, solution- or melt-coating, bag production, deep-drawing, box-making, tubing, splitting and so on.

The aforementioned shaped articles and laminated products, in particular in the form of film or sheet, can be improved in physical properties by stretching or drafting, if required.

In the present invention, the composition is melt-molded into a film material. The thickness of such film is virtually optional and may range from a few microns to several hundred microns. The term 'film' as used in this specification means a film in the broad sense of the term, thus including a sheet, tape, tube, container and so on.

The film obtained in the above manner is conditioned for absorption of moisture or drying, if necessary, and then stretched.

This stretching may be uniaxial or biaxial. The effects of the invention are better materialized when the stretching ratio or draft is as high as possible. In the case of uniaxial stretching, the stretching ratio is preferably at least 1.5 times and, for still better results, not less than 2 times. In the case of biaxial stretching, the stretching ratio is preferably not less than 1.5 times, more desirably not less than 2 times and, for still better results, not less than 4 times on the area basis.

As to the stretching technique that can be employed, there may be mentioned roll stretching, tenter stretching, tubular stretching and stretching blow processes, as well as high-draft deep drawing or vacuum molding. In the case of biaxial stretching, whichever of concurrent biaxial stretching and serial biaxial stretching can be adopted.

The stretching temperature is selected from the range of about 40° to 150° C.

After completion of stretching, the product is thermally set. This thermal setting can be effected by the well-known technique. Thus, with the stretched film being held in taut condition, it is heat-treated at a temperature of 50° to 160° C., preferably at 80° to 160° C. for about 2 to 600 seconds.

The resulting oriented film can be subjected to a variety of processings such as cooling, rolling, printing, dry lamination, solution- or melt-coating, bag-making, deep-drawing, box-making, tubing, splitting and so on.

The film, sheet or container obtainable from the composition of the present invention is useful for packaging foodstuffs, pharmaceutical products, industrial chemicals, agrichemical products and so on.

EFFECTS

The composition according to the invention which comprises (A), (B), (C) and (D) is excellent in long run property and the shaped articles obtained therefrom are characterized by their markedly improved interlayer adhesion, oxygen barrier property, stretchability and flexibility.

EXAMPLES

The following examples are further illustrative of the composition of the present invention. In the following description, all parts and % are by weight unless otherwise indicated.

PREPARATION OF THE SAMPLES

| Sample | Saponified ethylene-vinyl acetate copolymer | | | |
|---|---|---|---|---|
| | E-1 | E-2 | E-3 | E-4 |
| Ethylene content (mole %) | 30 | 33 | 40 | 45 |
| Degree of saponification of vinyl acetate component (mole %) | 99.8 | 99.3 | 99.5 | 99.6 |
| Melt flow rate (g/10 min.) | 2 | 3.5 | 15 | 5 |

| | Polyolefin resin | | |
|---|---|---|---|
| Sample | | MFR (g/10 min.) | Melting point (°C.) |
| P-1 | Polypropylene | 3 | 166 |
| P-2 | Ethylene-propylene block copolymer (Ethylene content 12%) | 5 | 163 |
| P-3 | Ethylene-propylene random copolymer (Ethylene content 3%) | 8 | 165 |
| P-4 | Polypropylene | 8 | 166 |
| P-5 | Linear low-density polyethylene | 4 | 124 |
| P-6 | High-density polyethylene | 1.2 | 134 |

| | Graft polymer | | | |
|---|---|---|---|---|
| Sample | G-1 | G-2 | G-3 | G-4 |
| Trunk polymer (a) | Ethylene-propylene block copolymer (Ethylene content 12%) | Ethylene-propylene Random copolymer (Ethylene content 3%) | Medium-density polyethylene | High-density polyethylene |
| MFR (g/10 min.) | (4.2) | (3.6) | (10.5) | (27) |
| Unsaturated carboxylic acid (b) | Maleic anhydride | Maleic anhydride | Maleic anhydride | Maleic anhydride |
| Polyamide oligomer (c) | ε-Caprolactam oligomer ($\overline{P}$:24) | ε-Caprolactam oligomer ($\overline{P}$:50) | Hexamethylene-diamine/adipic acid oligomer ($\overline{P}$:31) | ε-Caprolactam oligomer ($\overline{P}$:25) |
| Composition ratio | | | | |
| (a)/(b) (weight ratio) | 100/2.1 | 100/2.5 | 100/1.8 | 100/2.9 |
| (c)/(b) (mole | ½ | 2/2.5 | 1.4/1.8 | 0.9/2.9 |

HYDROTALCITE COMPOUND

H-1: $Mg_{4.5}Al_2(OH)_{13}CO_3.3.5H_2O$
H-2: $Mg_6Al_2(OH)_{16}CO_3.4H_2O$
H-3: $Ca_6Al_2(OH)_{16}CO_3.4H_2O$
H-4: $Zn_6Al_2(OH)_{16}CO_3.4H_2O$

EXAMPLES 1 THROUGH 10 AND COMPARATIVE EXAMPLES 1 AND 2

Laminates having the construction shown below were produced using the compositions comprising a combination of (A), (B), (C) and (D) as specified in Table 1.

Outer layer (I): Polyamide 6.
Intermediate layer (II): Composition according to the invention comprising (A), (B), (C) and (D).
Adhesive layer (III): Maleic anhydride-modified ethylene-vinyl acetate copolymer (MFR: 2.1 g/10 minutes (190° C., 2160 g)].
Inner layer (IV): Ethylene-vinyl acetate copolymer with a vinyl acetate content of 10% [MFR: 2 g/10 minutes (190° C., 2160 g)].
Four-layer laminates with layer thicknesses of (I)/(II)/(III)/(IV)=20/10/5/20 microns. For stretchability testing, films with layer thicknesses 80/40/20/80 microns were used.

EXTRUSION MODLING CONDITIONS

Extruder:
40 mm-dia. extruder (for inner layer)
40 mm-dia. extruder (for intermediate layer)
30 mm-dia. extruder (for adhesive layer)
40 mm-dia. extruder (for outer layer)
Screw:
For each, L/C = 2.8; compression ratio = 3.2
Speed of screw revolution:
For inner layer: 40 rpm
For intermediate layer: 20 rpm
For adhesive layer: 20 rpm
For outer layer: 40 rpm
Die:
T-Die with a 4-layer combining adapter Die width: 450 mm
Extrusion temperature:
Extruders for inner, outer and adhesive layers
$C_1=190°$ C., $C_2=200°$ C., $C_3=210°$ C., $C_4=220°$ C.
Extruder for intermediate layer
$C_1=180°$ C., $C_2=200°$ C., $C_3=220°$ C., $C_4=220°$ C.
Combining adapter: 210° C.
T-die: 210° C.

The results obtained are shown in Table 1.
The bond strength was measured after retort treatment (120° C.×30 minutes).

The long-run property was evaluated after 96 hours of continuous extrusion molding, followed by disjointing of the extruder, in terms of the state of gel adhesion on the screen mesh as rated on the 5-point scale from 1 (no adhesion) to 5 (adhesion on the whole surface) or the state of adhesion of a scorched or burnt material on the screw surface as rated on the 5-point scale from 1 (no adhesion) to 5 (adhesion on the whole surface).

The oxygen permeability was determined with a MOCON Oxtran 10/50. The stretchability was evaluated in terms of uneven stretching in simultaneous biaxial stretching (3×3 times) at 90° C.

The film impact strength was determined using a film impact tester (impact head diameter 3/2 inches, 20° C.×65% RH).

The resistance to flexural fatigue was evaluated in terms of the number of bendings until formation of one pinhole (until an abrupt increase in oxygen permeability) with a Gelboflex tester.

TABLE 1

| | | Blending ratio | | Long-run property (96 hours) | | Physical properties | | | | |
|---|---|---|---|---|---|---|---|---|---|---|
| | Material | E/P/G | Part per 100 parts of E + P + G | Gel on screen mesh | Burnt material on screw | Oxygen permeability (cc.20 μ/m².day.atm) 25° C. × 75% RH | Stretchability | Bond strength g/15 mm | Film impact strength (kg.cm/mm) | Resistance to flexural fatigue (times) |
| Example | | | | | | | | | | |
| 1 | E-1 P-1 G-2 H-1 | 70/25/5 | 0.05 | 1 | 2 | 1.2 | ⊚ | 850 | 140 | 2000 |
| 2 | E-2 P-2 G-3 H-2 | 80/10/10 | 0.1 | 1 | 1 | 1.1 | ⊚ | 870 | 130 | 2000 |
| 3 | E-3 P-3 G-2 H-3 | 65/25/10 | 0.1 | 2 | 2 | 1.9 | ⊚ | 880 | 135 | 2500 |
| 4 | E-4 P-4 G-3 H-4 | 75/20/5 | 0.05 | 1 | 2 | 2.3 | ⊚ | 770 | 150 | 3000 |
| 5 | E-1 P-5 G-1 H-1 | 75/20/5 | 0.3 | 1 | 1 | 1.0 | ⊚ | 900 | 140 | 3500 |
| 6 | E-2 P-6 G-1 H-2 | 70/20/10 | 0.15 | 1 | 2 | 1.2 | ⊚ | 860 | 140 | 2500 |

TABLE 1-continued

|  | Material | Blending ratio E/P/G | Part per 100 parts of E + P + G | Long-run property (96 hours) Gel on screen mesh | Burnt material on screw | Oxygen permeability (cc.20 $\mu/m^2$.day.atm) 25° C. × 75% RH | Stretch- ability | Bond strength g/15 mm | Film impact strength (kg.cm/mm) | Resistance to flexural fatigue (times) |
|---|---|---|---|---|---|---|---|---|---|---|
| 7 | E-3 P-1 G-1 H-1 | 85/10/5 | 0.1 | 1 | 1 | 1.6 | ○ | 820 | 125 | 1500 |
| 8 | E-1 P-5 G-4 H-2 | 80/15/5 | 0.2 | 1 | 2 | 1.0 | ⊙ | 900 | 130 | 3500 |
| 9 | E-2 P-4 G-3 H-1 | 75/25/10 | 0.1 | 1 | 1 | 1.1 | ⊙ | 840 | 140 | 2000 |
| 10 | E-3 P-6 G-4 H-2 | 70/25/5 | 0.1 | 2 | 2 | 1.7 | ○ | 880 | 130 | 1500 |
| Comparative Example 1 | E-1 P-1 H-1 | 73.7/26.3 | 0.05 | 1 | 2 | 1.1 | x | 210 | 45 | 10 |
| 2 | E-1 P-1 G-1 | 70/25/5 | 0 | 3 | 4 | 1.2 | △ | 150 | 70 | 500 |

In the above table, evaluation criteria are as follows:
⊙: Very Good ○: Good △: Fair x: Bad

EXAMPLES 11 THROUGH 15

Laminates composed of the five layers mentioned below were produced under the conditions mentioned below.

Inner layer (I) and outer layer (V): Linear low-density polyethylene (MFR 1.5 g/10 minutes, density 0.920)

Adhesive layers (II) and (IV): Maleic anhydride-modified linear low density polyethylene (MFR 2 g/10 minutes)

Intermediate layer (III): Composition according to the invention comprising (A), (B), (C) and (D).

Layer Composition and layer thicknesses (microns):
(I)/(II)/(III)/(IV)/(V) = 20/5/10/1/20

For stretchability testing, the layer thicknesses 80/20/40/20/80 were used.

Extruder:
40 mm-dia. extruder (for inner and outer layers)
40 mm-dia. extruder (for intermediate layer)
30 mm-dia. extruder (for adhesive layers)

Screw:
For each, L/D = 28, compression ratio = 3.2

Speed of screw revolution:
For inner and outer layers: 65 rpm
For intermediate layer: 20 rpm
For adhesive layers: 30 rpm.

Die:
T-Die with a 5-layer combining adapter
Die width: 450 mm

Extrusion temperature:
Extruders for inner, outer and adhesive layers
$C_1 = 190°$ C., $C_2 = 200°$ C., $C_3 = 210°$ C., $C_4 = 220°$ C.,
Extruder for intermediate layer
$C_1 = 180°$ C., $C_2 = 200°$ C., $C_3 = 220°$ C., $C_4 = 220°$ C.,
Combining adapter: 210° C.
T die: 210° C.

The results obtained are shown in Table 2.

TABLE 2

|  | Material | Blending ratio E/P/G | Part per 100 parts of E + P + G | Long-run property (96 hours) Gel on screen mesh | Burnt material on screw | Oxygen permeability (cc.20 $\mu/m^2$.day.atm) 25° C. × 75% RH | Stretch- ability | Bond strength g/15 mm | Film impact strength (kg.cm/mm) | Resistance to flexural fatigue (times) |
|---|---|---|---|---|---|---|---|---|---|---|
| 11 | E-1 P-1 G-2 H-1 | 70/25/5 | 0.05 | 1 | 1 | 1.2 | ⊙ | 950 | 165 | 2500 |
| 12 | E-2 P-2 G-3 H-2 | 80/10/10 | 0.1 | 1 | 1 | 1.0 | ⊙ | 900 | 150 | 3500 |
| 13 | E-3 P-3 G-2 H-3 | 65/25/10 | 0.1 | 1 | 2 | 1.9 | ⊙ | 950 | 145 | 4000 |
| 14 | E-4 P-4 | 75/20/5 | 0.05 | 1 | 2 | 2.4 | ⊙ | 830 | 175 | 2500 |

TABLE 2-continued

| | | Blending ratio | | Long-run property (96 hours) | | Physical properties | | | | |
|---|---|---|---|---|---|---|---|---|---|---|
| | | | Part per 100 parts of E + P + G | Gel on screen mesh | Burnt material on screw | Oxygen permeability (cc.20 μ/m².day.atm) 25° C. × 75% RH | Stretch-ability | Bond strength g/15 mm | Film impact strength (kg.cm/mm) | Resistance to flexural fatigue (times) |
| | Material | E/P/G | | | | | | | | |
| 15 | G-3<br>H-4<br>E-1<br>P-5<br>G-1<br>H-1 | 75/20/5 | 0.3 | 1 | 1 | 1.1 | ⓒ | 960 | 165 | 3000 |

EXAMPLES 16 THROUGH 25 AND COMPARATIVE EXAMPLES 3 AND 4

Using the following graft polymer, a four-layer laminate was produced in the same manner as Examples 1 through 10. The results are set forth in Table 3.

| | Graft polymer | | | |
|---|---|---|---|---|
| Sample | G-5 | G-6 | G-7 | G-8 |
| Trunk polymer (a) | Ethylene-propylene block copolymer (Ethylene content 12%) | Ethylene-propylene Random copolymer (Ethylene content 3%) | Medium-density polyethylene | High-density polyethylene |
| MFR (g/10 min.) | (4.2) | (3.6) | (10.5) | (27) |
| Unsaturated carboxylic acid (b) | Maleic anhydride | Maleic anhydride | Maleic anhydride | Maleic anhydride |
| Polyamide (c) | ε-Caprolactam type (P:200) | ε-Caprolactam type (P:500) | Hexamethylene-diamine/adipic acid type (P:500) | ε-Caprolactam type (P:350) |
| Composition ratio | | | | |
| (a)/(b) (weight ratio) | 100/2.1 | 100/2.5 | 100/1.8 | 100/2.9 |
| (c)/(b) (mole ratio) | ½ | 2/2.5 | 1.4/1.8 | 0.9/2.9 |

TABLE 3

| | | Blending ratio | | Long-run property (96 hours) | | Physical properties | | | | |
|---|---|---|---|---|---|---|---|---|---|---|
| | | | Part per 100 parts of E + P + G | Gel on screen mesh | Burnt material on screw | Oxygen permeability (cc.20 μ/m².day.atm) 25° C. × 75% RH | Stretch-ability | Bond strength g/15 mm | Film impact strength (kg.cm/mm) | Resistance to flexural fatigue (times) |
| | Material | E/P/G | | | | | | | | |
| Example | | | | | | | | | | |
| 16 | E-1<br>P-1<br>G-6<br>H-1 | 70/25/5 | 0.05 | 1 | 2 | 1.4 | ⓒ | 950 | 150 | 2,500 |
| 17 | E-2<br>P-2<br>G-7<br>H-2 | 80/10/10 | 0.1 | 1 | 1 | 1.0 | ⓒ | 920 | 135 | 2,000 |
| 18 | E-3<br>P-3<br>G-6<br>H-3 | 65/25/10 | 0.1 | 2 | 2 | 1.7 | ⓒ | 860 | 150 | 3,000 |
| 19 | E-4<br>P-4<br>G-7<br>H-4 | 75/20/5 | 0.05 | 1 | 2 | 2.5 | ⓒ | 750 | 165 | 3,500 |
| 20 | E-1<br>P-5<br>G-5<br>H-1 | 75/20/5 | 0.3 | 1 | 1 | 1.1 | ⓒ | 940 | 130 | 3,000 |
| 21 | E-2<br>P-6<br>G-5<br>H-2 | 70/20/10 | 0.15 | 1 | 2 | 1.3 | ○ | 890 | 145 | 3,000 |
| 22 | E-3<br>P-1 | 85/10/5 | 0.1 | 1 | 1 | 1.8 | ○ | 870 | 135 | 2,000 |

TABLE 3-continued

| | Material | Blending ratio E/P/G | Part per 100 parts of E + P + G | Long-run property (96 hours) Gel on screen mesh | Burnt material on screw | Oxygen permeability (cc.20 μ/m².day.atm) 25° C. × 75% RH | Stretch-ability | Bond strength g/15 mm | Film impact strength (kg.cm/mm) | Resistance to flexural fatigue (times) |
|---|---|---|---|---|---|---|---|---|---|---|
| 23 | G-5 H-1 E-1 P-5 | 80/15/5 | 0.2 | 1 | 2 | 1.1 | ⊚ | 910 | 125 | 4,000 |
| 24 | G-8 H-2 E-2 P-4 | 75/25/10 | 0.1 | 1 | 1 | 1.3 | ⊚ | 830 | 150 | 2,500 |
| 25 | G-7 H-1 E-3 P-6 | 70/25/5 | 0.1 | 2 | 2 | 1.5 | ○ | 920 | 145 | 2,000 |
| Comparative Example | G-8 H-2 | | | | | | | | | |
| 3 | E-1 P-1 H-1 | 73.7/26.3 | 0.05 | 1 | 2 | 1.1 | x | 210 | 45 | 10 |
| 4 | E-1 P-1 G-5 | 70/25/5 | 0 | 3 | 4 | 1.3 | Δ | 140 | 65 | 400 |

EXAMPLES 26 THROUGH 30

A five-layer laminate was produced in the same manner as Examples 11 through 15. The results are set forth in Table 4.

TABLE 4

| | Material | Blending ratio E/P/G | Part per 100 parts of E + P + G | Long-run property (96 hours) Gel on screen mesh | Burnt material on screw | Oxygen permeability (cc.20 μ/m².day.atm) 25° C. × 75% RH | Stretch-ability | Bond strength g/15 mm | Film impact strength (kg.cm/mm) | Resistance to flexural fatigue (times) |
|---|---|---|---|---|---|---|---|---|---|---|
| 26 | E-1 P-1 G-6 H-1 | 70/25/5 | 0.05 | 1 | 1 | 1.4 | ⊚ | 980 | 150 | 2,000 |
| 27 | E-2 P-2 G-7 H-2 | 80/10/10 | 0.1 | 1 | 1 | 1.2 | ⊚ | 880 | 175 | 3,500 |
| 28 | E-3 P-3 G-6 H-3 | 65/25/10 | 0.1 | 1 | 2 | 1.7 | ⊚ | 940 | 155 | 4,000 |
| 29 | E-4 P-4 G-7 H-4 | 75/20/5 | 0.05 | 1 | 2 | 2.7 | ⊚ | 890 | 160 | 3,000 |
| 30 | E-1 P-5 G-5 H-1 | 75/20/5 | 0.3 | 1 | 1 | 1.0 | ⊚ | 970 | 170 | 2,500 |

What is claimed is:

1. A resin composition including a saponified ethylene-vinyl acetate copolymer, a polyolefin resin, a graft copolymer and hydrotalcite comprising
    (A) 50 to 99.5 weight % of a saponified ethylene-vinyl acetate copolymer with an ethylene content of 20 to 60 mole % and a degree of saponification of its vinyl acetate component being not less than 95 mole %,
    (B) 0.4 to 50 weight % of a polyolefin resin,
    (C) 0.1 to 15 weight % of a graft polymer obtained by grafting 0.05 to 10 parts by weight of an ethylenically unsaturated carboxylic acid or a derivative thereof to 100 parts by weight of a polyolefin resin to produce an adduct and reacting the adduct with a polyamide oligomer or polyamide where the reaction ratio of the polyamide oligomer or polyamide to the adduct is 0.01 to 1 mole per mole of carboxyl group of the adduct, and
    (D) a hydrotalcite compound representable by the general formula

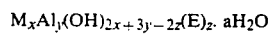

wherein M is Mg, Ca or Zn, E is $CO_3$ or $HPO_4$, x, y and z each independently is positive number and a is 0 (zero) or a positive number.

2. A shaped article obtained by melt-molding a composition as claimed in claim 1.

3. A laminated structure at least one layer of which is comprised of a composition as claimed in claim 1.

4. A shaped article as claimed in claim 2 which is at least uniaxially oriented.

5. A laminated structure as claimed in claim 3 which is at least uniaxially oriented.

* * * * *